April 15, 1952     H. D. ERLEBACH, SR     2,593,283
WEEDER
Filed Nov. 3, 1948
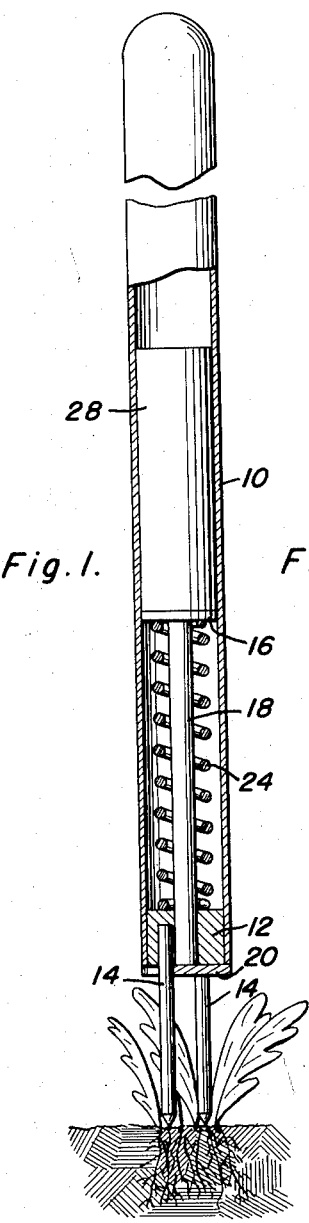
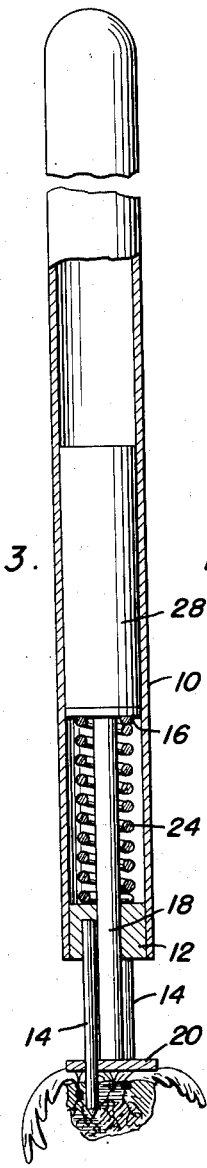
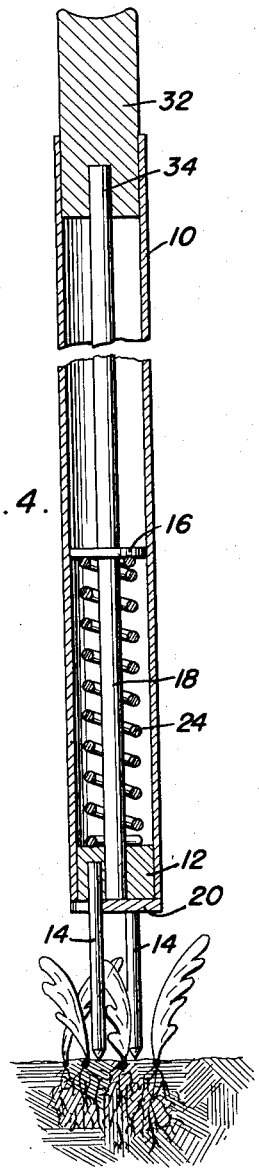
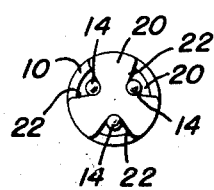
Harry D. Erlebach, Sr.
INVENTOR.

Patented Apr. 15, 1952

2,593,283

UNITED STATES PATENT OFFICE 2,593,283

WEEDER

Harry D. Erlebach, Sr., Ontario, Oreg.

Application November 3, 1948, Serial No. 58,123

3 Claims. (Cl. 294—50)

This invention relates to novel and useful improvements in devices for weeding gardens and the like.

An object of this invention is to remove a weed from a lawn, garden or the like by the insertion of a number of prongs in the ground adjacent the weed, rotating the prongs so that they will remove the weed from the turf and ground by the roots, then lift the entire device supporting the prongs with the weeds or weed therein, and remove the weed from the prong by means of a wiper, actuated by improved means.

Another object of this invention is to actuate the said wiper by an inertia member which is disposed slidably in a handle type tube for actuation of a plunger having the wiper attached thereto and also to actuate the wiper in an alternative manner by means of a manual operation of a button, both means of actuation of the wiper being opposed by a spring which reacts on the wiper and tube-handle.

Ancillary objects and features of novelty will become apparent to those skilled in the art, in following the description of the preferred forms of the invention, illustrated in the accompanying drawings, wherein:

Figure 1 is a partial sectional view of one form of the invention;

Figure 2 is a bottom view of the device shown in Figure 1;

Figure 3 is a sectional view of the device shown in Figure 1, showing a second operative position thereof, and Figure 4 is a sectional view of the second form of the invention.

The structure of the present invention includes a tubular handle 10 with a closure 12 in one end thereof. This closure forms a closed end for the said tube 10 and has a number of prongs 14 extending therefrom. These prongs are adapted to be depressed in the ground adjacent a weed, as is shown in the drawings, and rotated approximately a quarter or a half turn in order to release the roots from the ground. Then, the turf adjacent the weed and the weed is adapted to be lifted as shown in Figure 3.

A plunger which includes a head 16, a stem 18 attached to the head and a wiper plate 20 is slidably disposed with relation to the tube 10. The head 16 is interiorly of the tube 10, as is a portion of the stem. The said stem 18 extends through an opening provided in the closure 12 of the tube and accordingly, reciprocation of the plunger with respect to the tube 10 will urge the wiper against the prongs 14 which are disposed in suitable recesses 22 formed in the periphery of the wiper.

A spring 24 or other suitable equivalent resilient biasing means is disposed in the tube 10, seating on the closed end member 12 and on the bottom of the head 16. This spring constantly urges the plunger inwardly of the tube 10.

After weeds have been removed from the ground, it is only necessary to shake the device or turn the device upside down and then reverse it to the proper position. This action causes the inertia member or weight 28 to be slidably actuated within the tube 10, striking forcefully the head 16, depressing the spring 24 slightly (see Figure 3) and moving the wiper axially of the prongs 14 to remove the weeds from the said prongs.

Referring now to Figure 4 it will be seen that substantially all of the structure described in conjunction with the first embodiment of the device is illustrated. The differentiating feature resides in the means for actuating the wiper 20. In this instance the tube 10 has an open top end with a button or actuator 32 disposed for sliding movement therein. A rod 34 forming a part of said actuator is attached to the button 32 and is disposed on the piston head 16. Accordingly, upon reciprocation of the plunger with respect to the tube 10, the weeds may be urged from the prongs 14.

It is noted at this point that it is within the purview of the present invention to utilize but a single stem 18 in conjunction with the plunger associated with the second embodiment of the invention, with the piston head 16 being in the form of a simple collar or washer disposed thereon in the expeditious and appropriate place. This of course would obviate the necessity of having two separate elements 34 and 18 respectively.

While there has been described and illustrated but preferred forms of the invention, it is apparent that variations may be made without departing from the spirit thereof.

Having described the invention, what is claimed as new is:

1. A weeder comprising a tubular handle having an inertia member slidably disposed therein, prongs extending from one end of said handle, a plunger including a head disposed in said handle, a stem attached to said head and extending through one end of said plunger, a prong wiper attached to said stem adjacent said prongs, said inertia member contacting said head when said handle is shaken to urge said plunger outwardly of said handle, and a spring engaging said head and reacting on said handle to constantly urge said plunger inwardly of said handle.

2. In a weeding device, a tubular handle having a lower end, prongs attached to said end, a plunger including a head disposed in said handle, a stem slidable through said end, and a prong wiper attached to said stem exterior of said handle, a spring disposed within said handle and seated on said end and said head constantly urging said plunger interiorly of said handle, the upper end of said handle being closed defining with the top surface of said head and the walls of said tubular handle, a chamber and means located in said chamber for urging said plunger against the urging force of said spring, including an inertia member slidably disposed in said handle and engaging said head to urge said plunger outwardly of said handle.

3. In a weeding device, a tubular handle of constant diameter from end to end, said tubular handle having a closure block secured within one end thereof, said closure block having an axial bore therein, a plunger including a head disposed in said handle and a stem passed through said bore, a spring contacting and reacting on said closure and the bottom surface of said head normally urging said plunger inwardly of said handle, means slidably disposed in said handle for urging said plunger outwardly against the opposing force of said spring, a wiper plate carried by the end of said stem and disposed exteriorly of said handle, said wiper block being substantially of the same diameter as said handle and having three peripherally opening recesses therein, three prongs secured to said closure and arranged on a circle of smaller diameter than the diameter of said handle, and said prongs being disposed in the innermost portions of said recesses in said wiper.

HARRY D. ERLEBACH, SR.

REFERENCES CITED

The following references are of record in the file of this patent:

UNITED STATES PATENTS

| Number | Name | Date |
|---|---|---|
| 316,334 | Coyle | Apr. 21, 1885 |
| 1,092,818 | Bittner | Apr. 14, 1914 |
| 1,801,084 | Huie | Apr. 14, 1931 |
| 2,049,298 | Jung | July 28, 1936 |
| 2,191,226 | Clem | Feb. 20, 1940 |
| 2,402,550 | Hiack | June 25, 1946 |
| 2,500,647 | Schulthess | Mar. 14, 1950 |

FOREIGN PATENTS

| Number | Country | Date |
|---|---|---|
| 5,946 | Great Britain | Mar. 21, 1895 |